United States Patent [19]
Weiss

[11] Patent Number: 6,065,029
[45] Date of Patent: May 16, 2000

[54] METHOD AND SYSTEM FOR PROVIDING A RANDOM NUMBER GENERATOR

[75] Inventor: Richard Alan Weiss, Los Altos Hills, Calif.

[73] Assignee: **N*Able Technologies, Inc.**, Cupertino, Calif.

[21] Appl. No.: 09/084,604

[22] Filed: May 26, 1998

[51] Int. Cl.$^7$ ........................................ G06F 7/58
[52] U.S. Cl. ............................................. 708/251
[58] Field of Search .................... 708/251, 250, 708/252, 253, 256

[56] References Cited

U.S. PATENT DOCUMENTS

| | | | |
|---|---|---|---|
| 3,790,768 | 2/1974 | Chevalier et al. | 708/251 |
| 4,769,777 | 9/1988 | Brittle et al. | 708/251 |
| 4,799,259 | 1/1989 | Ogrodski | 708/251 |
| 4,855,690 | 8/1989 | Dias | 708/251 |
| 5,117,380 | 5/1992 | Tanagawa | 708/251 |
| 5,706,218 | 1/1998 | Hoffman | 708/251 |

*Primary Examiner*—David H. Malzahn
*Attorney, Agent, or Firm*—Sawyer Law Group LLP

[57] ABSTRACT

A system and method for generating a random number is disclosed. The method and system include providing at least one oscillator, providing a sampler, and providing a sample control. The sampler is coupled to the at least one oscillator. The sampler is for sampling the at least one oscillator to provide at least a portion of the random number. The sample control is coupled to the sampler and is for controlling the sampler to sample the at least one oscillator at an interval which is based on a portion of a previous random number provided using the at least one oscillator.

24 Claims, 5 Drawing Sheets

METHOD AND SYSTEM FOR PROVIDING A RANDOM NUMBER GENERATOR

FIELD OF THE INVENTION

The present invention relates to random number generation and more particularly to a method and system for using providing a random number generator having nonperiodic sampling and which can be designed, built, and tested using standard application specific integrated circuit ("ASIC") techniques.

BACKGROUND OF THE INVENTION

Random number generation is employed in a variety of technologies. For example, the generation of random numbers is important in cryptography. Typically, digital circuitry is employed in order to generate the random numbers used in such technologies.

The conventional digital circuits are used to generate random numbers may use oscillators, such as ring oscillators, and linear feedback shift registers ("LFSR"). For example, some conventional digital random number generators ("RNG") simply use a LFSR only. Other conventional RNGs generate random numbers using a ring oscillator, which typically consists of an odd number of gates, such as inverters or NAND gates, connected in series to form a ring. Still other conventional RNGs employ a combination of an oscillator and a LFSR.

Although conventional RNGs are capable of providing random numbers, many conventional RNGs are periodic, even though the period may be relatively long. Where the sampling is periodic, the numbers provided may not be as random as desired. In addition, it may be desirable to place the RNG on a chip while not requiring special devices on the chip or external inputs to generate the randomness. It would be also be desirable for the RNG to be relatively small. In order to prevent the chip from burning out, the power dissipated should also be relatively small. It would also be beneficial if the RNG dissipated no power when inactive.

Moreover, conventional digital circuits are traditionally deterministic. Thus, the output of a conventional digital circuit is typically predictable. However, the output of an RNG should be random rather than deterministic. This feature of conventional RNGs makes conventional RNGs difficult to design, build, and test using standard digital circuitry techniques.

Accordingly, what is needed is a system and method for generating random numbers which provides at least some of the benefits discussed above. It would also be desirable for the system and method to be designed, built, and tested using standard techniques. The present invention addresses such a need.

SUMMARY OF THE INVENTION

The present invention provides a method and system for generating a random number. The method and system comprise providing at least one oscillator, providing a sampler, and providing a sample control. The sampler is coupled to the at least one oscillator. The sampler is for sampling the at least one oscillator to provide the random number. The sample is control coupled to the sampler. The sample control is for controlling the sampler to sample the at least one oscillator at an interval which is based on a portion of a previous random number provided using the at least one oscillator.

According to the system and method disclosed herein, the present invention provides a random number based on a previous random number calculated using the method and system. As a result, sampling can be made more random. Moreover, the method and system can be provided and tested using standard techniques.

DETAILED DESCRIPTION OF THE INVENTION

Figure 1:
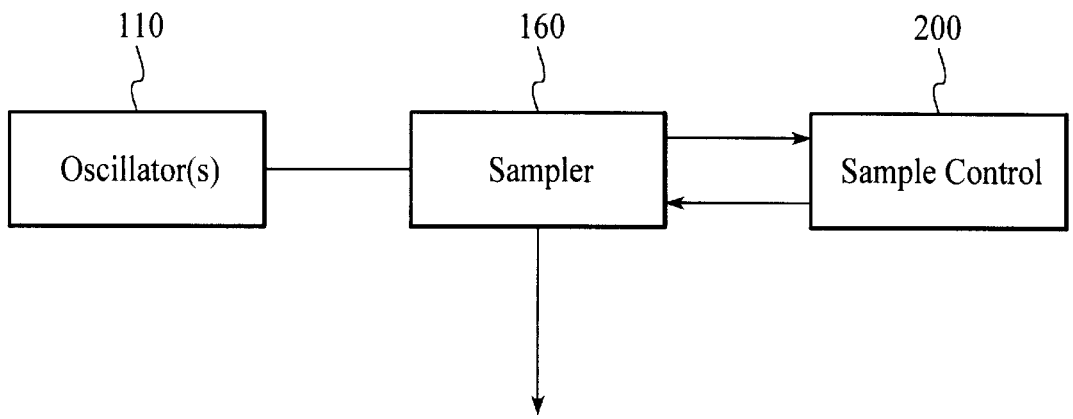
FIG. 1 is a block diagram of a system in accordance with the present invention.

The present invention relates to an improvement in random number generators. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Conventional digital circuits used to generate random numbers may use oscillators, such as ring oscillators, and linear feedback shift registers ("LFSR"). For example, some conventional digital random number generators ("RNG") simply use a LFSR having an input which is a combination of the output and an intermediate stage. Such a conventional RNG is typically periodic. By designing the period of the RNG to be significantly longer than the sampling time, a stream of pseudo random numbers can be generated during a period.

Similarly, other conventional RNGs employ a ring oscillator to generate a random number. A ring oscillator typically consists of an odd number of gates, such as inverters or NAND gates, connected in series to form a ring. In some conventional RNGs, a gate of the ring oscillator may have as an input a combination of the outputs of other gates in the ring. The ring oscillator is sampled at a particular point in the ring oscillator to provide a pseudo random number. Some conventional RNGs sample the output of the ring oscillator at a frequency different from that of the ring oscillator to provide a more random output.

Other conventional RNGs employ a combination of an oscillator and a LFSR. The oscillator used by a conventional RNG can be a ring oscillator. In some conventional RNGs, the ring oscillator is used drive a clock for the LFSR. The frequency of the ring oscillator, which depends upon the number of gates in the ring, is the clock frequency for the LFSR. Similarly, other conventional RNGs use the output of the ring oscillator to provide an input for the LFSR. In such conventional RNGs, the LFSR is sampled at a different frequency to provide random numbers.

Although conventional RNGs are capable of providing at least random numbers or pseudo random numbers, one of ordinary skill in the art will realize that many conventional RNGs are periodic, even though the period may be relatively long. As a result, the numbers generated may be less random than is desired for a particular application. In addition, regardless of the RNG used, it is desirable to place the RNG on a chip not requiring special devices on the chip or external inputs to generate the random numbers. It would be also be desirable for the RNG to be relatively small. For example, a RNG using less than approximately one thousand gates would be desirable. In order to prevent the chip from burning out, the power dissipated should be relatively small. Moreover, it would be beneficial if the RNG dissipated no power when inactive.

One of ordinary skill in the art will also readily realize that a conventional RNG is difficult to test using standard techniques. Traditionally, digital circuits are tested for manufacturing defects by using a set of "test vectors." Test vectors are a series of stimuli or inputs to the digital circuit being tested, with a knowledge of the exact response or output expected by the digital circuit. During manufacture, chips which do not respond as expected are considered faulty. RNGs are designed to produce a relatively random output from a given set of inputs. Thus, it is difficult to test a RNG for defects using conventional test vectors. It is also difficult to design a new set of test vectors which will adequately test a RNG.

For example, conventional test vectors are designed to test for single stuck-at faults. A single stuck-at fault models manufacturing defects by assuming that any given connection in the digital circuit is broken. The broken connection is assumed to be coupled to ground or to a power supply. The test vectors should be able to determine from the output of the digital circuit whether a manufacturing defect exists in that instance of the circuit. The effectiveness of the test vectors in detecting every possible stuck-at fault is generally measured, with scores greater than ninety percent generally desired. With a conventional RNG, it is difficult to design a set of vectors that detect stuck-at faults within the ring oscillators because the output of a ring oscillator is by definition unpredictable and because test vectors require predictability.

The present invention provides for a method and system for providing a random number. The present invention will be described in terms of a particular number of ring oscillators each having a specified number of gates, specific components of the random number generator, and a particular number of bits being used. However, one of ordinary skill in the art will readily recognize that this method and system will operate effectively for other numbers and types of oscillators, other components which can be substituted, and a different number of bits.

The present invention provides a method and system for generating a random number. The method and system comprise providing at least one oscillator, providing a sampler, and providing a sample control. The sampler is coupled to the at least one oscillator. The sampler is for sampling the at least one oscillator to provide the random number. The sample control is coupled to the sampler. The sample control is for controlling the sampler to sample the at least one oscillator at an interval which is based on a portion of a previous random number provided using the at least one oscillator.

To more particularly illustrate the method and system in accordance with the present invention, refer now to FIG. 1 depicting a high level block diagram of one embodiment 100 of such a system. The system 100 includes oscillator(s) 110, a sampler 160, and a sample control 200. In a preferred embodiment, the sampler 160 is a shift register. Also in a preferred embodiment, the oscillator(s) 110 includes a plurality of ring oscillators.

Figure 2:
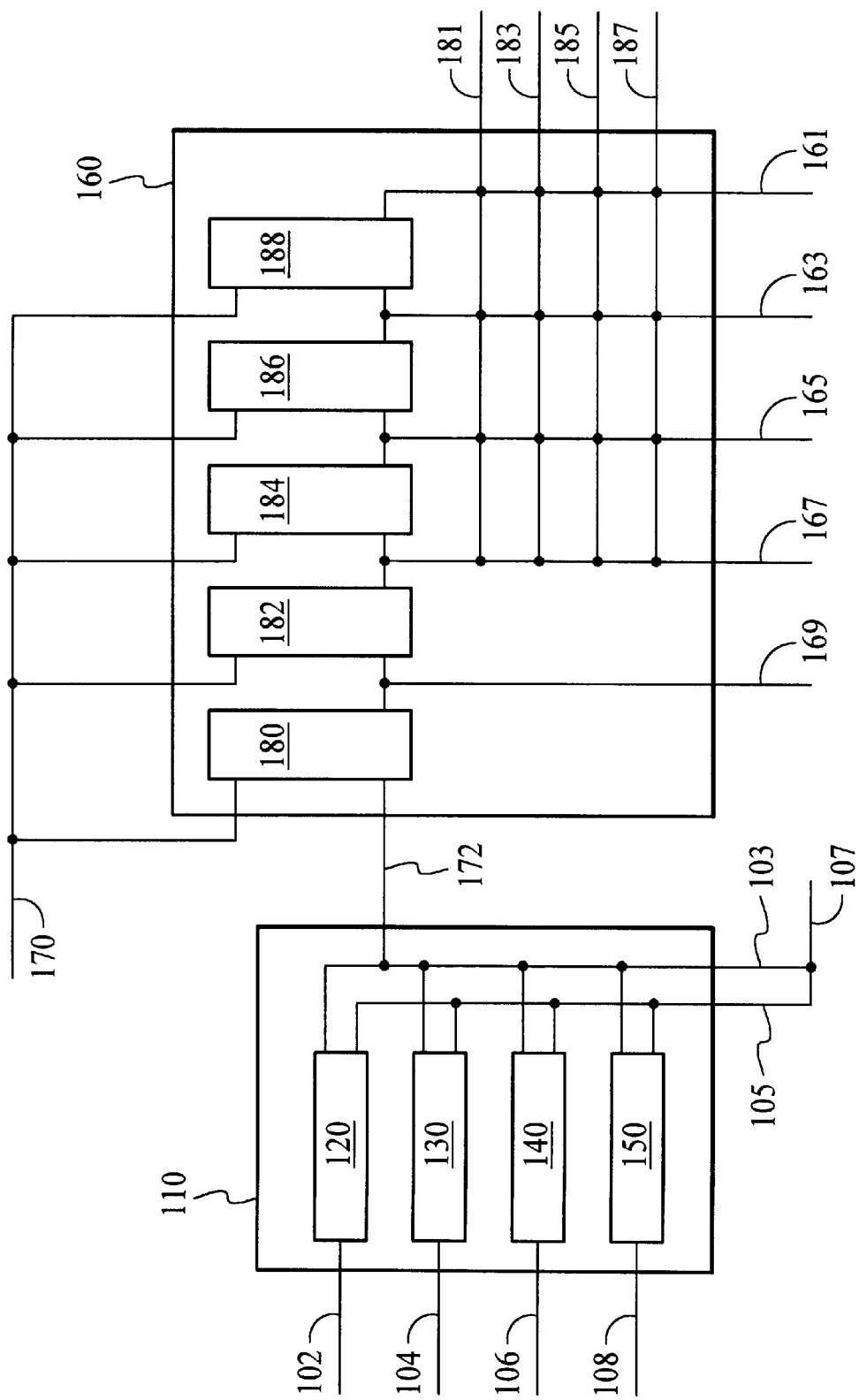
FIG. 2 is a more detailed block diagram of a portion of the system in accordance with the present invention.

To more particularly illustrate the method and system in accordance with the present invention, refer now to FIG. 2, depicting a more detailed block diagram of one embodiment of the oscillator(s) 110 and one embodiment of the sampler 160. In a preferred embodiment, the oscillator(s) 110 includes four ring oscillators 120, 130, 140, and 150. However, nothing prevents the method and system from having another number of oscillators. In a preferred embodiment, each ring oscillator 120, 130, 140, and 150 has an odd number of stages. Also in a preferred embodiment, each ring oscillator 120, 130, 140, and 150 has a different number of stages. Each ring oscillator 120, 130, 140, and 150 may be constructed from some combination of inverters, NAND gates, or NOR gates.

A tap from one stage of each oscillator is coupled to a tap line 103. Because each ring oscillator 120, 130, 140, and 150 has an odd number of stages, the tap toggles between states "0" and "1" while the ring oscillator 120, 130, 140, or 150 is running. In a preferred embodiment, each ring oscillator 120, 130, 140, and 150 has a large number of stages to improve the probability that the tap is either a "0" or a "1" during sampling, instead of being in a meta-stable condition. The meta-stable condition could lead to bias in the random number generated if the output taps coupled to the tap line 103 have a predisposition to become either "0" or "1" when sampled while in a meta-stable state. In a preferred embodiment, the ring oscillator 120 has seventeen stages, the ring oscillator 130 has nineteen stages, the ring oscillator 140 has twenty-three stages and the ring oscillator 140 has twenty-nine stages. In addition, each ring oscillator 120, 130, 140, and 150 has at least one test tap coupled to the a tap test line 105. The tap test line 105 and the test taps for each ring oscillator 120, 130, 140, and 150 is used to test to ensure that each ring oscillator 120, 130, 140, and 150 is interconnected properly. Each ring oscillator 120, 130, 140, and 150 is controlled via lines 102, 104, 106, and 108.

Figure 3:
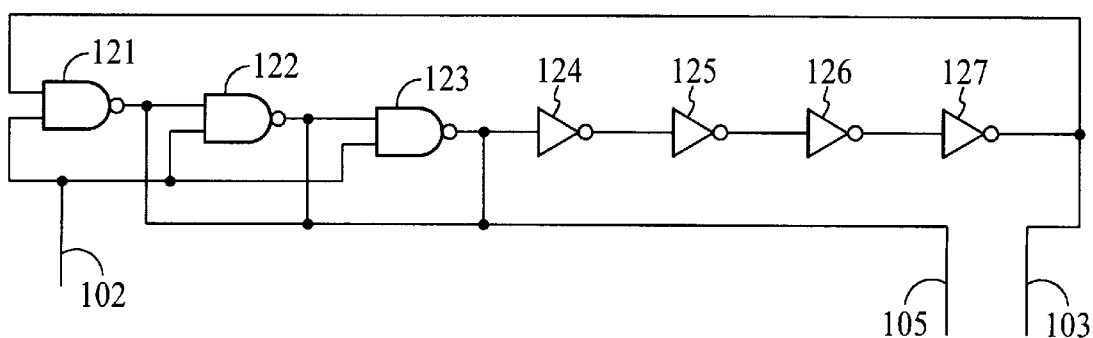
FIG. 3 is a block diagram of one embodiment of a ring oscillator in accordance with the present invention.

FIG. 3 depicts one embodiment of the ring oscillator 120 in accordance with the present invention. However, the following discussion regarding the embodiment of the ring oscillator 120 shown in FIG. 3 applies to ring oscillators 120, 130, 140, and 150. Although the ring oscillator 120 is depicted in FIG. 3 as having seven stages 121, 122, 123, 124, 125, 126, and 127, nothing prevents the ring oscillator 120 from having another number of stages. For example, the ring oscillator 120 has seventeen stages in a preferred embodiment. An output tap for the ring oscillator 120 is provided at the output of one of the inverters 127. Consequently, the output of the inverter 127 is coupled with the line 103. In addition, although the ring oscillator 120 is depicted as being made up of inverters 124–127 and NAND gates 121–123, each ring oscillator might be made up of other inverting gates, not shown, or be padded with non-inverting gates, not shown. Thus, the inverters 124–127 can be replaced with other inverting gates, not shown. However, the gates 121, 122, and 123 coupled to the test tap line 105 may not be arbitrarily replaced with inverting gates, not shown. Gates which can be used for the gates 121, 122, and 123 include other NAND gates, NOR gates, and inverting multiplexers.

In a preferred embodiment, the ring oscillator 120, as well as ring oscillators 130, 140, and 150, include three NAND gates 121, 122, and 123. The output of each of the NAND gate 121, 122, and 123 is tapped. These taps are coupled to the tap test line 105. Preferably, line 105 is three bits wide.

The test taps at the output of each NAND gate 121, 122, and 123 are used to help ensure that each stage of the ring oscillator 120 can toggle during a manufacturing test. In addition, the NAND gates 121, 122, and 123 may be used to disable or enable the ring oscillator 120 by providing a "0" or "1", respectively, over the control line 102. In a preferred embodiment, the control line 102 is three bits wide.

The frequency of a ring oscillator depends on the number of stages, the types of gates used, the lengths of the interconnects between the gates, and the operating conditions for the ring oscillator. By using a combination of a different number of stages of each ring oscillator 120, 130, 140 and 150, each ring oscillator will toggle at a different frequency. By using different types of gates for the stages, the toggle frequency will also vary differently due to different integrated circuit processing variations, operating voltages, and temperature variations. Because each ring oscillator 120, 130, 140, and 150 is constructed by using different combinations of stages, gates, and processing, each ring oscillator 120, 130, 140, and 150 toggles at a different frequency. For example, in one embodiment, the ring oscillator 120 having seventeen stages toggles at a higher rate than the ring oscillator 130 having nineteen stages. In this embodiment, the ring oscillator 130 having nineteen stages may toggle at a higher rate than the ring oscillator 140 having twenty-three stages. Similarly, in this embodiment, the ring oscillator 140 having twenty-three stages may toggle at a higher rate than the ring oscillator 150 having twenty-nine stages. In another embodiment, the relationship between the frequencies of each ring oscillator 120, 130, 140, and 150 may be different. However, each ring oscillator 120, 130, 140, and 150 must have a different frequency. Also in a preferred embodiment, the number of stages of each ring oscillator 120, 130, 140, and 150 is relatively prime (not sharing common factors). As discussed above, the length of the interconnects between gates also affects the frequency of each ring oscillator 120, 130, 140 or 150. As a result of the design, placement, and routing, the period for oscillation of one of the ring oscillators 120, 130, 140, and 150 (the period for toggling the tap) is not a multiple of the period for oscillation for another one of the ring oscillators 120, 130, 140, or 150.

Referring back to FIG. 2, one embodiment of the sampler 160 is also depicted. In a preferred embodiment, the sampler 160 is a shift register having five stages 180, 182, 184, 186, and 188. In a preferred embodiment, the stages are activated by a signal provided over the line 170. However, nothing prevents the use of another number of stages. A line 172 couples the tap line 103 to the input for the first stage 180. Consequently, the state of the tap from each of the ring oscillators 120, 130, 140, and 150 can be input to the sampler 160. In a preferred embodiment, one bit is latched into the shift register 160 from one each the ring oscillators 120, 130, 140, and 150 during a sampling. In a preferred embodiment, the random number is sixteen bits in length. In the preferred embodiment, therefore, the ring oscillators 120, 130, 140, and 150 are each sampled four times to provide the random number. The random number provided to the shift register 160 is output over the lines 181, 183, 187, and 189. In a preferred embodiment, the line 181 provides the first four bits of the random number latched into the shift register 160. In a preferred embodiment, the line 183 provides the second set of four bits of the random number latched into the shift register 160. In a preferred embodiment, the line 185 provides the third set of four bits of the random number latched into the shift register 160. In a preferred embodiment, the line 187 provides the fourth set of four bits of the random number latched into the shift register 160. Thus, lines 181, 183, 185, and 187 are preferably each four bits wide. The first stage 180 of the shift register 160 is used to help ensure that the random number provided is electrically stable. Consequently, the random number is read from stages 182, 184, 186, and 188 of the shift register 160.

The lines 161, 163, 165, and 167 provide the bits from which a match value, discussed below, for the sample control 200 is determined. As a result, the bits from which the match value is determined are at least a portion of the random number. In a preferred embodiment, the lines 161, 163, 165, and 167 provide the same bits as the lines 181, 183, 185, and 187.

Figure 4:
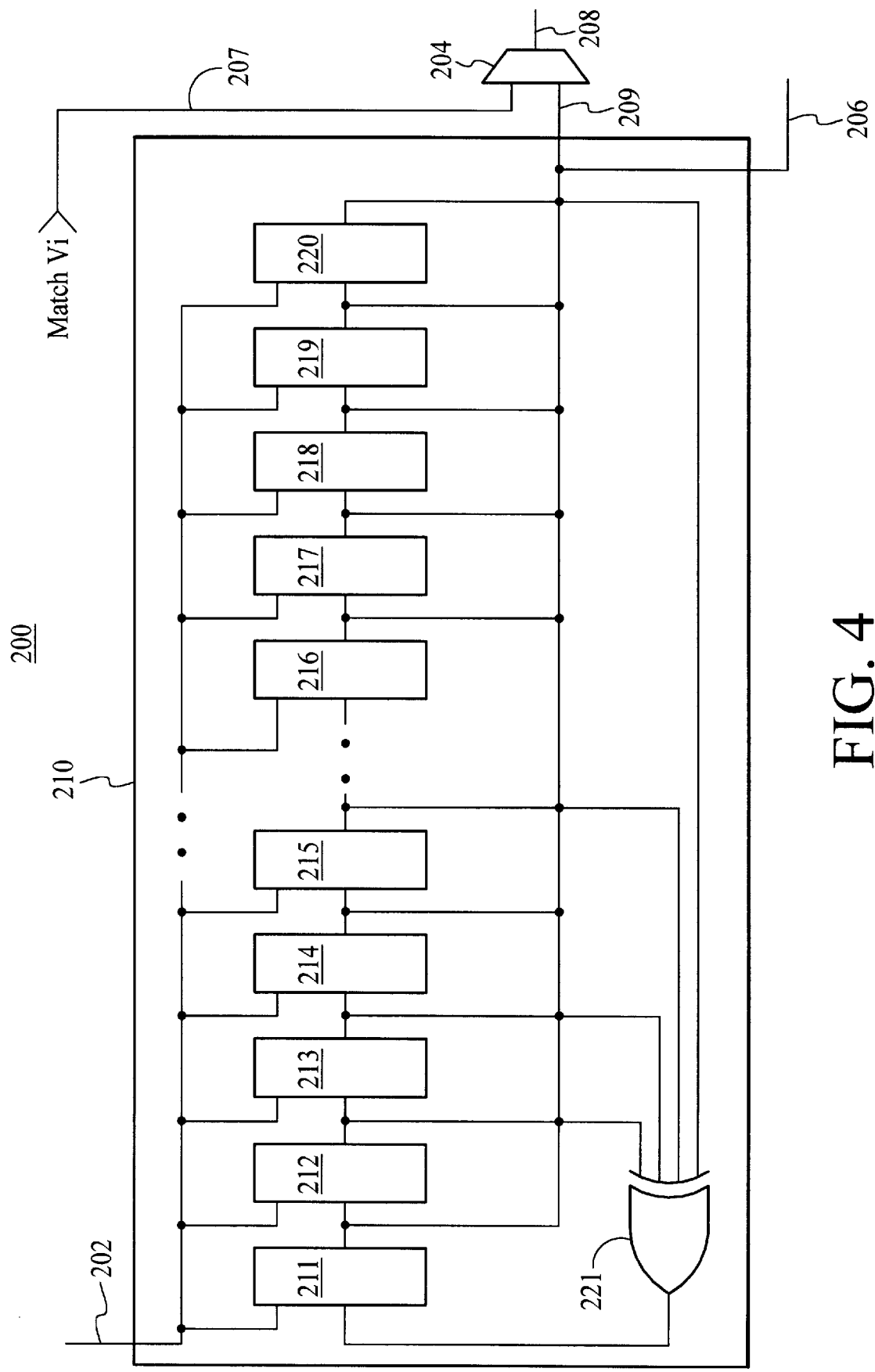
FIG. 4 is a more detailed block diagram of the sample control in accordance with the present invention.

FIG. 4 depicts one embodiment of the sample control 200. In a preferred embodiment, the sample control 200 includes a controller 204 and a linear feedback shift register ("LFSR") 210. However, in some alternate embodiments, not shown, the LFSR 210 may be replaced with another counter, such as a binary counter or a gray code counter which counts by changing only one bit each time the counter is incremented. Although only ten stages 211 through 220 are expressly depicted in FIG. 4, in a preferred embodiment, the LFSR 210 includes sixteen stages. Moreover, nothing prevents the use of a LFSR 210 having a different number of stages. The LFSR 210 also includes an XOR gate 221 which combines the outputs of stages 212, 213, 215, and 220 and feeds the resultant back to the input of the first stage 211.

The LFSR 210 generates values which are provided via line 209 to the controller 204. Preferably the line 209 is sixteen bits wide. The value generated by the LFSR 210 is compared to the match value 202 by the controller 204. The match value is determined based on a portion of a previous random number provided by the shift register 160 from a sampling of the ring oscillators 120, 130, 140, and 150. In a preferred embodiment, the match value is selectable at seven, ten, thirteen, or sixteen bits in length and is comprised of the appropriate number the bits from the stages 182, 184, 186, and 188 of the shift register 160. However, it is believed that longer match values provide more random numbers, though at a lower rate. The length of the match value is chosen to ensure that a sufficient number of clock cycles, or interval, have passed. The LFSR 210 changes its value and each ring oscillator 120, 130, 140, and 150 oscillates on a clock pulse. Allowing a sufficient interval to pass helps ensure that the bits latched into the shift register 160 from the ring oscillators 120, 130, 140, and 150 will be random. The controller 204 provides a signal via line 208 when the value in the LFSR and the match value are the same.

In the embodiment depicted in FIG. 4, the sample control 200 also includes a line 206 coupled with the output of the last stage of LFSR 210. Using the line 206, the value in the LFSR 210 can be read, for example by a central processing unit, not shown. During testing, the line 206 can be used to read the LFSR 210. However, the line 210 is not necessary to the operation of the LFSR 210.

Figure 5:
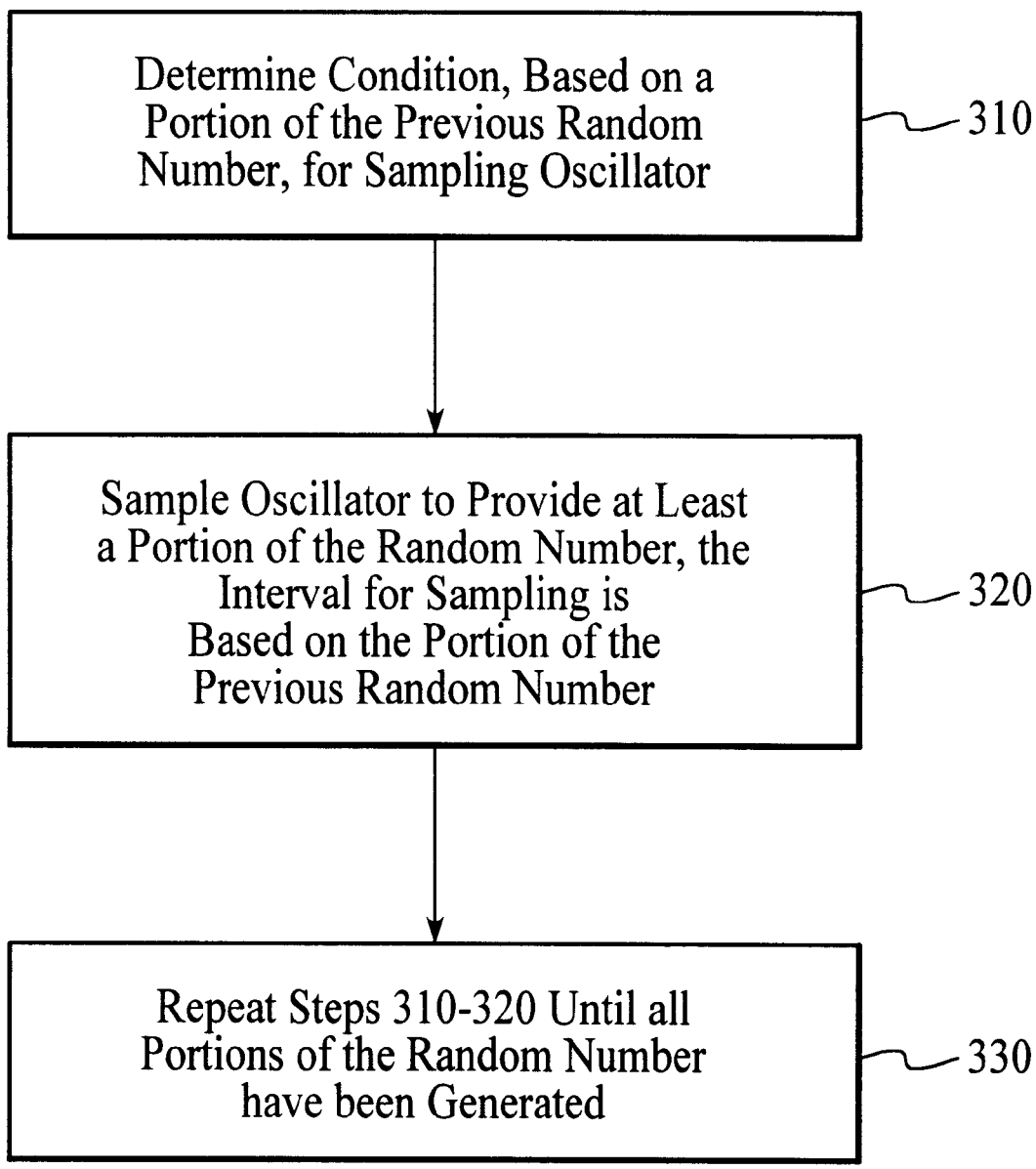
FIG. 5 is a flow chart of one method for providing a random number in accordance with the present invention.

FIG. 5 depicts a high level flow chart of a method 300 for providing a random number using the system 100. A condition for sampling the oscillator(s) is determined via step 310. This condition is based on a portion of a previous random number. In one embodiment, the condition is determined by the sample control 200. When the condition is met, the oscillator(s) 110 can sampled to provide at least a portion of the random number being generated via step 320. In step 320, the oscillator(s) 110 is sampled such that the interval before sampling is based on the portion of the previous random number. In one embodiment, step 320 is performed by using the sample control 200 to command the sampler 160 to sample the oscillator(s) 110 after the condition is met. If the random number is not completely generated, then steps 310 and 320 are repeated via step 330. When the steps 310 and 320 are repeated, a portion of the random number just generated is used to calculate the condition for generating a next portion of the random number.

Figure 6:
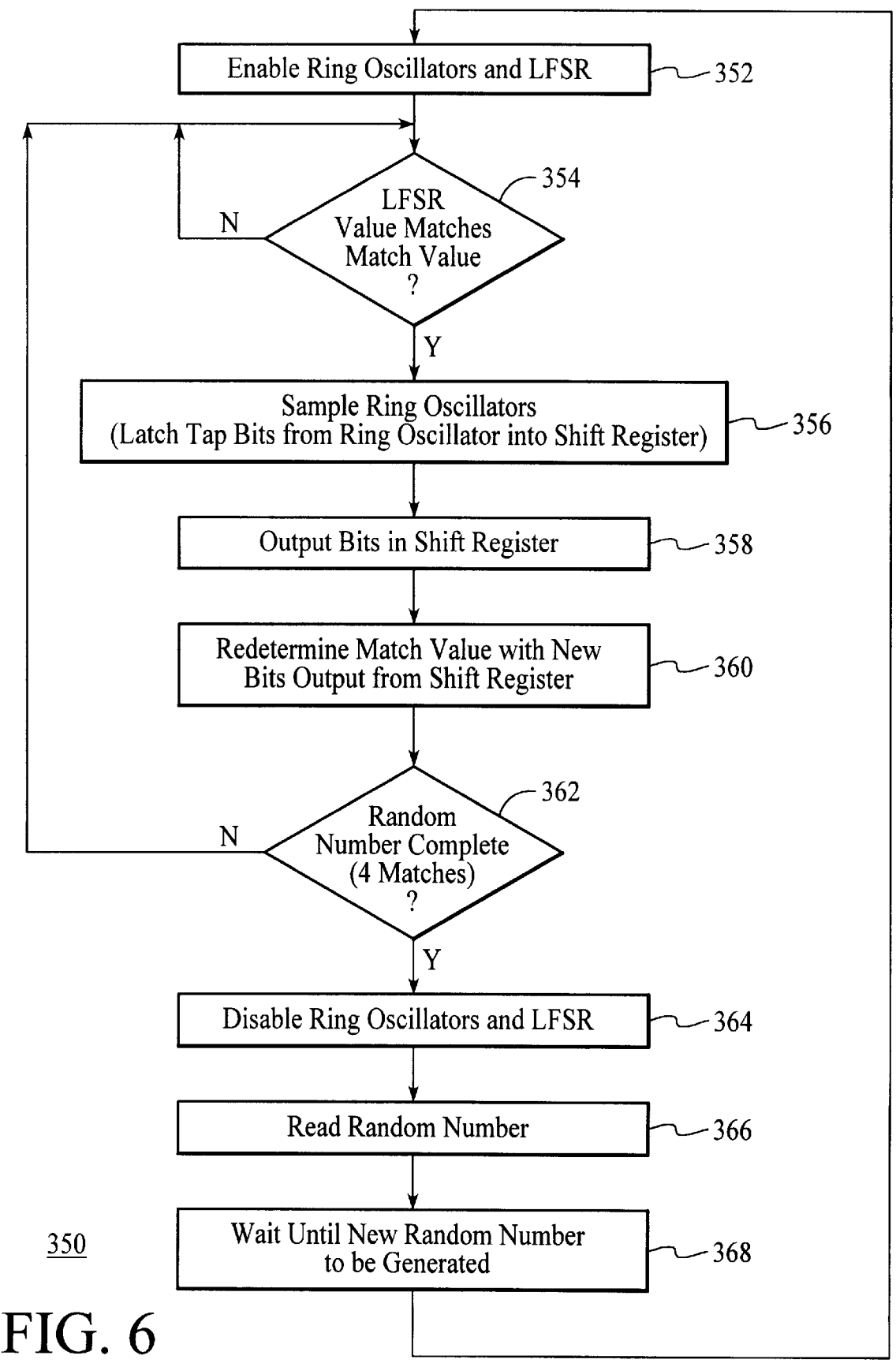
FIG. 6 is a more flow chart of a method for providing a random number in accordance with the present invention.

To more particularly illustrate how the system 100 functions, refer now to FIG. 6 which is a detailed flow chart of one embodiment of a method 350 for generating random numbers in accordance with the present invention.

The ring oscillators 120, 130, 140, and 150 and the LFSR 210 are enabled via step 352. The LFSR 210 generates a series of values. It is then determined if the value in the LFSR is the same as the match value based on a previously generated random number, via step 354. In a preferred embodiment, the match value has a length of thirteen bits to ensure that a sufficient interval has passed to help ensure that the number being generated is random. In the preferred embodiment, the maximum interval to generate each set of four bits is approximately eight thousand clock cycles. On average, approximately four thousand clock cycles will pass before the value in the LFSR 210 matches the match value. As a result, approximately six thousand new random numbers of sixteen bits each may be generated in less than approximately one second.

If the value in the LFSR 210 is the same as the match value, then the ring oscillators 120, 130, 140, and 150 are sampled via step 356. In a preferred embodiment, step 356 is performed by latching the state of a tap, a tap bit, from each ring oscillator 120, 130, 140, and 150 into the first register 180 of the shift register 160. As a result, the contents of stages 180, 182, 184, and 186 are latched into the next register 182, 184, 186, and 188, respectively. Thus, on each sampling, a portion of a new random number is latched into the shift register 160, and a portion of the previous random number is discarded by the shift register 160.

The contents of registers 182, 184, 186, and 188 are then output via step 358 so that a new match value can be determined. In a preferred embodiment, step 358 includes providing at least a portion of the random number over the lines 161, 163, 165, and 167. The contents of these registers 182, 184, 186, and 188 include part of the previous random number and a portion of the random number being generated.

A new match value is determined via step 360. The new match value is based on the portion random number just sampled via step 356 and a portion of a previous random number remaining after the portion of the random number is output via step 358. In a preferred embodiment, four bits from the random number currently being generated which reside in register 182 and twelve bits from the previous random number, from registers 184, 186, and 188, are provided to calculate the match value.

It is then determined if the entire random number has been generated, via step 262. In a preferred embodiment, this determination is made by ascertaining whether four matches between the value in the LFSR 210 and the match value have occurred. If the random number has not been completed, then the system 100 returns to step 354. A new set of four bits would be sampled at the appropriate interval based on a combination of the previous random number and the bits already generated for the random number. The process of latching bits in at the appropriate interval and recalculating a match value would continue until the random number has been generated.

If the random number is complete, then the LFSR 210 and ring oscillators 120, 130, 140, and 150 are disabled via step 364. The new random number may be read from the stages 182, 184, 186, and 188 of the shift register 160, via step 366. Note that in the embodiment shown, the portion of the random number residing in stage 188 was generated just prior to the previous random number being read. However, when each portion of the random number is generated may not affect the operation of the system 100.

The system 100 then waits until a new random number is to be generated, via step 368. The LFSR 210 and the ring oscillators 120, 130, 140, and 150 remain disabled until another random number is to be generated. When another random number is to be generated, then step 352 is returned to, enabling the LFSR 210 and the ring oscillators 120, 130, 140, and 150. The method 350 then repeats to generated a new random number. Note that although the method 350 is described as sampling a specified number of bits a particular number of times for each random number, nothing prevents the method and system from sampling another number of times.

Because the sample interval is determined based on a previous random number and those bits recently generated, the ring oscillators 120, 130, 140, and 150 are sampled at aperiodic intervals. As a result, the random numbers may be provided without requiring an external event to generate the randomness. In addition, because the LFSR 210 and the ring oscillators 120, 130, 140, and 150 are disabled when a new random number is not to be generated, the power dissipated by the system 100 is reduced. Moreover, the LFSR 210 and the ring oscillators 120, 130, 140, and 150 may not dissipate a great deal of power while in operation. Consequently, the chances that the chip on which the system 100 resides will burn out are reduced. Moreover, a large number of gates are not required in order to generate the random number. In a preferred embodiment, approximately one thousand gates are required by the system 100. For example, one embodiment of the system 100 contains 1150 gates. Finally, the system 100 is capable of generating a large number of random numbers within a relatively small amount of time. For example, the system can generate six thousand per second when using a match value thirteen bits of length.

In addition to the benefits discussed above, the system 100 can be adequately tested using standard application specific integrated circuit ("ASIC") test techniques. Conventionally, manufacturing defects are modelled as "stuck-at" faults. For example, for the system 100, a large percentage of single stuck-at faults may be detected. Referring back to FIG. 3, the single stuck-at faults in the ring oscillators 120, 130, 140 and 150 can be detected due to the test taps output over line 105, while faults in the control logic can be detected using conventional test techniques. In one embodiment of the system 100, up to one hundred percent of single stuck-at faults in the ring oscillators 120, 130, 140, and 150 can be detected because of the test taps at the output of NAND gates 121, 122, and 123. For example, if one input to the NAND gate 121 is stuck at a low value, the output from the test tap coupled to the output of the NAND gate 121 will always be high. The output for a given input can be predicted for the test taps output on the line 105. Thus, a traditional test vector for single stuck-at faults can adequately detect single stuck-at faults in the ring oscillators 120, 130, 140, and 150. Thus, the system 100 can be tested using standard techniques. Thus, the system 100 can output a random number and be tested using standard ASIC techniques.

A method and system has been disclosed for generating random numbers. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A system for generating a random number comprising:

at least one oscillator;

a sampler coupled to the at least one oscillator for sampling the at least one oscillator to provide at least a portion of the random number; and a sample control coupled to the sampler, the sample control for controlling the sampler to sample the at least one oscillator at an interval based on a portion of a previous random number provided using the at least one oscillator.

2. The system of claim 1 wherein the sampler further comprises:

a shift register coupled with the at least one oscillator.

3. The system of claim 2 wherein the at least one oscillator further comprises:

a plurality of ring oscillators, each ring oscillator being sampled by the sampler to provide the at least the portion of the number.

4. The system of claim 3 wherein the sample control further comprises:

a linear feedback shift register (LFSR) for providing a value, the sample control controlling the sampler to sample the at least one oscillator when the sample control determines that a value in the LFSR matches a particular value determined by the sample control and based on the portion of the previous random number.

5. The system of claim 4 wherein the sample control further comprises:

means coupled with the LFSR for comparing the value in the LFSR with the particular value based on the portion of the previous random number and providing a sample signal for controlling the sampler to sample the at least one oscillator when the value in the LFSR matches the particular value.

6. The system of claim 5 wherein the sample control further comprises:

a line coupled with the LFSR for providing the particular value based on the portion of the previous random number, wherein the system is capable of providing a second random number.

7. The system of claim 6 wherein a predetermined portion of the random number is provided from each sampling of the at least one oscillator.

8. The system of claim 3 wherein the sample control further comprises:

a binary counter for providing a value, the sample control controlling the sampler to sample the at least one oscillator when the sample control determines that the value in the binary counter matches a particular value determined by the sample control and based on the portion of the previous random number.

9. The system of claim 3 wherein the sample control further comprises:

a gray code counter for providing a value, the sample control controlling the sampler to sample the at least one oscillator when the sample control determines that the value in the gray code counter matches a particular value determined by the sample control and based on the portion of the previous random number.

10. The system of claim 1 wherein the system can be checked for a plurality of single stuck-at faults using a plurality of test vectors.

11. A method for generating a random number comprising the steps of:

(a) determining a condition for sampling an oscillator based on a portion of a previous random number generated by sampling the oscillator, the portion of the previous random number being determined by a sample control; and (b) sampling the oscillator utilizing a sampler to provide at least a portion of the random number, the at least one oscillator being sampled after the sample control determines that the condition is met, such that the at least one oscillator is sampled at an interval based on the portion of the previous random number.

12. The method of claim 11 wherein the condition for sampling the oscillator is that a first value in the sample control matches a second value, the second value being calculated by the sample control based on the portion of the previous random number.

13. The method of claim 12 further comprising the steps of:

(c) determining if a new random number is to be generated; and (d) repeating steps (a) through (c) for the new random number.

14. A method for providing a random number generator comprising the steps of:

(a) providing at least one oscillator;

(b) providing a sampler coupled to the at least one oscillator for sampling the at least one oscillator to provide the random number; and (c) providing a sample control coupled to the sampler, the sample control for controlling the sampler to sample the at least one oscillator at an interval based on a portion of a previous random number provided by the sampler.

15. The method of claim 14 wherein the sampler providing step (b) includes the step of:

(b1) providing a shift register coupled with the at least one oscillator.

16. The method of claim 15 wherein the at least one oscillator providing step (a) further comprises the step of:

(a1) providing a plurality of ring oscillators, each ring oscillator being sampled by the sampler to provide the number.

17. The method of claim 16 wherein the sample control providing step (c) further comprises the step of:

(c1) providing a linear feedback shift register (LFSR) in the sample control and for providing a value, the sample control controlling the sampler to sample the at least one oscillator when the value in the LFSR matches a particular value determined by the sample control and based on the portion of the previous random number.

18. The method of claim 16 wherein the sample control providing step (c) further comprises the step of:

(c1) providing a binary counter in the sample control and for providing a value, the sample control controlling the sampler to sample the at least one oscillator when the sample control determines that the value in the binary counter matches a particular value determined by the sample control and based on a portion of a previous random number.

19. The method of claim 16 wherein the sample control providing step (c) further comprises the step of:
   (c1) providing a gray code counter in the sample control and for providing a value, the sample control controlling the sampler to sample the at least one oscillator when the sample control determines that the value in the gray code counter matches a particular value determined by the sample control and based on a portion of a previous random number.

20. A method for generating a random number comprising the steps of:
   (a) enabling at least one oscillator and a means for generating a first value;
   (b) determining if the first value matches a second value using a sample control, the second value being determined by a sample control and being based on a first portion of a previous random number provided using the at least one oscillator; and
   (c) if the first value matches the second value then
      (c1) sampling the at least one oscillator to provide at least a portion of the random number;
      (c2) outputting the at least the portion of the random number;
      (c3) generating a new second value based on another portion of the previous random number and the at least the portion of the random number;
      (c4) determining if the random number is complete; and
      (c5) repeating steps (a) through (c) until the random number is complete.

21. The method of claim 20 further comprising the steps of:
   (d) disabling the at least one oscillator and the means for generating the first value.

22. The method of claim 21 further comprising the steps of:
   (e) determining if a new random number is to be generated; and
   (f) repeating steps (a) through (e) until the new random number is generated.

23. The method of claim 22 wherein the means for generating the first value further includes a linear feedback shift register.

24. The method of claim 22 wherein the at least one oscillator includes a plurality of oscillators, each of the plurality of oscillators having a tap, and wherein sampling step (c1) further includes the step of:
   (c1i) latching each of the plurality of taps into a sampler.

* * * * *